(12) United States Patent
Byren (10) Patent No.: US 8,780,182 B2
(45) Date of Patent: Jul. 15, 2014

(54) IMAGING SYSTEM AND METHOD USING PARTIAL-COHERENCE SPECKLE INTERFERENCE TOMOGRAPHY

(75) Inventor: Robert W. Byren, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 450 days.

(21) Appl. No.: 12/751,298

(22) Filed: Mar. 31, 2010

(65) Prior Publication Data

US 2011/0242285 A1  Oct. 6, 2011

(51) Int. Cl.
*H04N 13/02* (2006.01)
*G06K 9/00* (2006.01)

(52) U.S. Cl.
USPC .............. 348/47; 382/124; 382/325; 356/511

(58) Field of Classification Search
USPC ............ 348/47, 124, 100, 325, 511; 382/100, 382/124, 325; 356/511
See application file for complete search history.

(56) References Cited

U.S. PATENT DOCUMENTS

| | | |
|---|---|---|
| 4,053,228 A | 10/1977 | Schiller |
| 4,569,080 A | 2/1986 | Schiller |
| 4,652,131 A | 3/1987 | Fercher et al. |
| 5,109,427 A | 4/1992 | Yang |
| 5,241,606 A | 8/1993 | Horie |
| 5,293,873 A | 3/1994 | Fang |
| 5,675,407 A | 10/1997 | Geng |
| 5,706,085 A | 1/1998 | Blossey et al. |
| 5,870,196 A | 2/1999 | Lulli et al. |
| 5,892,575 A | 4/1999 | Marino |
| 5,973,784 A | 10/1999 | Szwaykowski et al. |
| 6,255,641 B1 | 7/2001 | Johnson |
| 6,485,981 B1 | 11/2002 | Fernandez |
| 6,678,632 B1 | 1/2004 | Iannarilli, Jr. |
| 6,834,798 B2 | 12/2004 | Bove |
| 6,879,712 B2 | 4/2005 | Tuncay et al. |
| 7,248,344 B2 | 7/2007 | Morcom |
| 7,301,608 B1 | 11/2007 | Mendenhall et al. |
| 7,705,337 B2 | 4/2010 | Gibson |
| 7,715,084 B2 | 5/2010 | Tan et al. |

(Continued)

OTHER PUBLICATIONS

"European Application Serial No. 11152555.6, European Extended Search Report mailed Jul. 21, 2011", 6 pgs.

(Continued)

*Primary Examiner* — Anner Holder
*Assistant Examiner* — On S Mung
(74) *Attorney, Agent, or Firm* — Burns & Levinson LLP; Joseph M. Maraia (57) ABSTRACT

A system for generating an image of contoured surface includes a light source that is configured to project an electromagnetic radiation beam onto the contoured surface, wherein the projected beam generates first radiation reflected from a first portion of the contoured surface to form a speckle pattern, and second radiation reflected from a second portion of the contoured surface which is substantially uniform in intensity. The reflected first and second reflected radiation is received by an optical detector, and may be processed. The processing is configured to (1) generate a plurality of images from the first and second reflected radiation, with each image being generated using different coherence length electromagnetic radiation from the light source, and (2) generate a 3-D image of the contoured surface from the plurality of images. Methods for generating a 3-D image of a contoured surface are also disclosed.

20 Claims, 4 Drawing Sheets

(56) References Cited

U.S. PATENT DOCUMENTS

| | | | |
|---|---|---|---|
| 7,817,256 | B2 | 10/2010 | Fuji et al. |
| 8,036,431 | B1 | 10/2011 | Fisher et al. |
| 2002/0016533 | A1* | 2/2002 | Marchitto et al. ............ 600/310 |
| 2002/0097896 | A1 | 7/2002 | Kuckendahl |
| 2003/0137669 | A1 | 7/2003 | Rollins et al. |
| 2004/0100631 | A1 | 5/2004 | Bashkansky et al. |
| 2004/0152989 | A1 | 8/2004 | Puttappa et al. |
| 2007/0263208 | A1 | 11/2007 | Yelin et al. |
| 2008/0123106 | A1 | 5/2008 | Zeng et al. |
| 2008/0154524 | A1 | 6/2008 | Shirley |
| 2009/0027689 | A1* | 1/2009 | Yun et al. ...................... 356/511 |
| 2009/0054788 | A1* | 2/2009 | Hauger et al. ................ 600/476 |
| 2010/0128109 | A1 | 5/2010 | Banks |
| 2011/0235871 | A1 | 9/2011 | Byren et al. |

OTHER PUBLICATIONS

"European Application Serial No. 11152555.6, Response filed Apr. 2, 2012 to Office Action mailed Jul. 21, 2011", 14 pgs.

Balboa, Il, et al., "Low-coherence optical fibre speckle interferometry", Meansurement Science and Technology, IOP, Bristol, GB, vol. 17, No. 4, pp. 605-616 (2006).

European Search Report dated Jul. 12, 2011 of European Application No. 11152555 filed Jan. 28, 2011 (5 pages).

Agrawal, Amit et al., "An Algebraic Approach to Surface Reconstruction from Gradient Fields," (2005).

Aull, B.F. et al., "Geiger-Mode Avalanche Photodiodes for Three-Dimensional Imaging," vol. 13, No. 2, Lincoln Lab. Journal, pp. 335-350, (2002).

Byren, R.W., "Laser Rangefinders," The Infrared and Electro-Optical Sys. Handbook, Infrared Info. Analysis Center and SPIE, vol. 6, pp. 79-82, 90-92 (1993).

Coffey, V. C., "Thin-Disk Laser Oscillator Generates Record-Energy Short Pulses," Laser Focus World, pp. 37-39 (May 2008).

Frankot, R. et al., "A Method for Enforcing Integrability in Shape from Shading Algorithms," IEEE Transactions on Pattern Analysis and Machine Intelligence, vol. 4, pp. 439-51 (1988).

Hergert, Earl et al., "APD Arrays: Geiger-mode APD arrays detect low light," Penwell Corp. (2008).

Koechner, W., "Solid-State Laser Eng'g," 2d ed., Springer Verlag, pp. 211-15 (1988).

Miyazaki, Daisuke et al., "Polarization-Based Inverse Rendering from a Single View," IEEE 0-7695-1950-4/03 (2003).

Mounier, D. et al., "Application of Transient Femtosecond Polarimetry/Ellipsometry Technique in Picosecond Laser Ultrasonics," IOP Publ'g Ltd., pp. 1-4 (2007).

NIST Special Publication 500-245 "American Nat'l Standard for Info. Sys.—Data Format for the Interchange of Fingerprint, Facial, and Scar Mark & Tatoo (SMT) Info.," ANSI/NIST-ITL 1 2000, p. 5 (2000).

NIST Special Publication 500-271 "American Nat'l Standard for Info. Sys.—Data Format for the Interchange of Fingerprint, Facial, and Other Biometric Information," ANSI/NIST-ITL 1 2007, p. 11, 2007.

Rahmann, Stefan et al., "Reconstruction of Specular Surfaces Using Polarization Imaging," IEEE 0-7695-1272-0/01, I-149-155 (2001).

Reid, Robert B., et al, "Quantifying Surface Normal Estimation," SPIE vol. 6240, pp. 624001-1-11 (2006).

Sadjadi, Firooz "Remote Sensing, Passive Three-Dimensional Sensing by Polarimetric Imaging," SPIE (2006).

Sadjadi, Firooz et al., "Extraction of Surface Normal & Index of Refraction Using a Pair of Passive Infrared Polarimetric Sensors," IEEE 1-4244-1180-7/07 (2007).

Stucker, M. et al., "Interpapillary Lines—the Variable Part of the Human Fingerprint," Journal of Forensic Sciences, vol. 46, Issue 4 (Jul. 2001).

Tyo, J. Scott et al., "The Effects of Thermal Equilibrium & Contrast in LWIR Polarimetric Images," OSA, vol. 15, No. 23 (2007).

Wolf, Lawrence B. et al., "Constraining Object Features Using a Polarization Reflectance Model," IEEE Transactions on Pattern Analysis & Machine Intelligence, vol. 13, No. 7, pp. 635-657 (1991).

Wolf, Lawrence B., "Image Understanding from Thermal Emission Polarization," IEEE Computer Society Conf. on Computer Vision & Pattern Recognition, 0-8186-8497-6/98, pp. 625-631 (1998).

Wolf, Lawrence B., "Shape from Polarization Images," IEEE Computer Society Workshop on Computer Vision, TH0210-5/87/0000/0079, pp. 79-85 (1987).

Wolf, Lawrence B., "Spectral & Polarization Stereo Mehtods Using a Single Light Source," Proceedings, ICCV, pp. 810-820 (1987).

Wu, Tai-Pang et al., "Visible Surface Reconstruction from Normals with Discontinuity Consideration," Proceedings of the IEEE Computer Society Conf.on Computer Vision and Pattern Recognition, pp. 1793-1800, (2006).

Zhou, Y. T. et al., "Edge Detection and Linear Feature Extraction Using a 2-D Random Field Model," IEEE Transactions on Pattern Analysis and Machine Intelligence, vol. 11, No. 1, pp. 84-85 (1989).

Rao et al., Study of Engineering Surfaces Using Laser-Scattering Techniques; Sadhans, vol. 28, Issue 3, pp. 739-761, Jun./Aug. 2003.

Cheng et al., Artificial Fingerprint Recognition by Using Optical Coherence Tomography with Autocorrelation Analysis, Applied Optics, vol. 45, No. 36, pp. 9238-9245, Dec. 20, 2006.

Gossage et al., Texture Analysis of Optical Coherence Tomography Images, Feasibility for Tissue Classification, Journal of Biomedical Optics, vol. 8, No. 3, pp. 570-575, Jul. 2003.

\* cited by examiner

IMAGING SYSTEM AND METHOD USING PARTIAL-COHERENCE SPECKLE INTERFERENCE TOMOGRAPHY

BACKGROUND

This application generally relates to three-dimensional (3-D) imaging, and more particularly, to surface contour measurement using partial-coherence speckle interference tomography.

In the fields of counter-insurgency, counter-terrorism and law enforcement there is a need to identify and track suspects from a distance, without the suspect's knowledge or cooperation.

Single-view passive sensors typically do not procure 3-D data and thus cannot provide measurement and recognition of 3-D spatial features. And, while conventional 3-D laser radar (ladar) sensors exist which use direct detection pulse-echo ranging techniques, these sensors typically do not have the range resolution necessary to measure the full topography of a human face. Coherent ladar sensors have demonstrated adequate resolution and range. Yet, coherent ladar sensors are relatively large, very complex due to the coherent source and heterodyne processing, and are quite expensive.

In addition, structural lighting profilometry has been proposed that uses one or more planar sheets of light to illuminate the target and an imaging sensor located some distance away from the source such that the parallax viewing angle produces a spatial profile of the target indicative of the depth. However, a disadvantage of this approach is that the source and receiver must be located at some baseline distance away from each other in order to produce the parallax viewing angle and that the required baseline distance increases with target range.

These conventional approaches thus have been impractical for remote, covert biometric feature capture and identification of a suspect.

SUMMARY

In an embodiment, a system for generating an image of a contoured surface comprises: a light source configured to project electromagnetic radiation onto the contoured surface, wherein the projected beam generates first radiation reflected from a first portion of the contoured surface to form a speckle pattern, and second radiation reflected from a second portion of the contoured surface which is substantially uniform in intensity; an optical detector configured to receive the first and second reflected radiation from the contoured surface; and a processor configured to (1) generate a plurality of images from the first and second reflected radiation, with each image being generated using different coherence length electromagnetic radiation from the light source, and (2) generate a 3-D image of the contoured surface from the plurality of images.

In another embodiment, a method for generating an image of a contoured surface comprises: projecting a beam of electromagnetic radiation onto the contoured surface, wherein the projected beam generates first radiation reflected from a first portion of the contoured surface to form a speckle pattern, and second radiation reflected from a second portion of the contoured surface which is substantially uniform in intensity; and receiving, with an optical detector, the first and second reflected radiation from the contoured surface, wherein each image is generated using different coherence length electromagnetic radiation from the light source, and generating, with a processor, a 3-D image of the contoured surface from the plurality of images.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not a limitation of the invention. In addition, it should be appreciated that structural features shown or described in any one embodiment herein can be used in other embodiments as well.

DETAILED DESCRIPTION

A methodology for 3-D imaging is described which uses partial-coherence speckle interference tomography for imaging contoured surfaces. An imaging system using this methodology provides accurate measurement of the topography of surfaces which can provide sufficient spatial resolution to distinguish the contours of the contoured surface. Embodiments described herein may rely on a partially-coherent speckle image pattern being generated from electromagnetic radiation (light) reflected from a contoured surface. The resultant speckle pattern can be used to distinguish differently-sloped physical features of the contoured surface.

A speckle pattern is a random intensity pattern that may be produced by the mutual interference of plural waves having different phases which add together to give a resultant wave whose amplitude and intensity vary randomly. For instance, when a surface is illuminated by a coherent light wave, each point thereof acts as a source of secondary waves, and light at any point in the scattered light field is a coherent superposition of waves which have been scattered from each point on the illuminated surface. The amplitude of the resultant electric field is the sum of the electric field amplitudes of these secondary waves and can range from some maximum due to complete constructive interference to zero due to complete destructive interference. Thus, the surface topography results in scattered reflected light randomly varying in intensity.

If the light is partially-coherent, its optical frequency (and wavelength) will not have a single value but will be spread over a finite range, which we assume to have a Gaussian line shape. Such partially-coherent light may be characterized by a coherence length, $l_C$, defined as the optical path length difference at which the fringe visibility of a light beam, which when interfered with itself, is reduced to $2^{-1/2}$. By this definition, the coherence length is equal to $0.64 c/\delta v$, where c is the speed of light in vacuum and $\delta v$ is the spread in optical frequency between the half power points of the presumed Gaussian line shape. For partially-coherent light, the interference between regions of the surface, which differ in range by more than $l_C$, will be substantially less sharp and the resultant intensity variations will be effectively averaged out.

As such, distinct transitional boundaries or edges may appear in the imagery between the speckled region and the uniform region where the depth of the pixel corresponds approximately to the coherence length. The edge may be visualized as a "contour line" representing the boundary separating regions of relatively steep and shallow slope as discriminated by the speckle averaging within each volume pixel (voxel) of an image.

If a plurality of speckle interferometry image frames are taken with electromagnetic radiation (light) of different coherence lengths, a 3-D image of the contoured surface may be generated. Speckle frames can be taken, for instance, by (1) sequentially changing the coherence length of a single laser between pulses, or (2) simultaneously transmitting multiple lasers of different wavelength having different coherence lengths. And, a tomography processing algorithm may be applied to the multiple images to (1) extract the pixel slope amplitude from the speckled images, (2) derive the direction of the slope which is orthogonal to the local edge boundary, and (3) create a 3-D image from the resulting vector slope information.

While reference herein is made to facial imaging and recognition, it will be appreciated that the disclosed methodology may be similarly used for detecting and/or identifying other contoured surfaces, such as combat vehicles and tactical missile launchers, etc. And when used with last-pulse logic processing, the disclosed methodology may be used to provide 3-D images of contoured surfaces located beneath camouflage netting or partially obscured by foliage.

This application is related to U.S. patent application Ser. No. 12/749,344, entitled "TEXTURED PATTERN SENSING USING PARTIAL-COHERENCE SPECKLE INTERFEROMETRY," herein incorporated by reference in its entirety.

Figure 1:
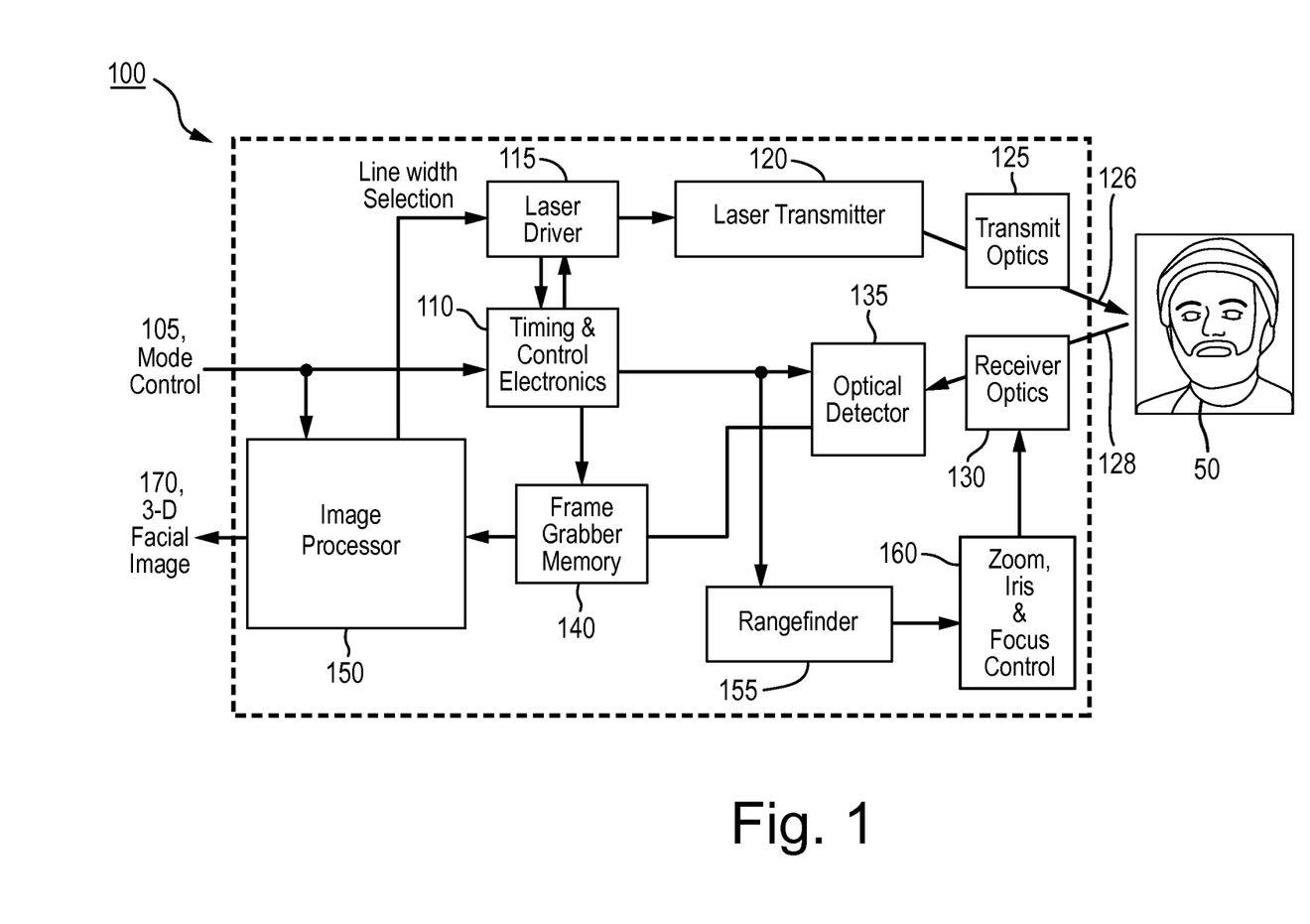
FIG. 1 illustrates a block diagram of an imaging system which uses a single selectable-coherence laser transmitter in accordance with an embodiment.

FIG. 1 illustrates a block diagram of imaging system 100 which uses a single selectable-coherence laser transmitter in accordance with an embodiment.

Laser driver 115 controls laser transmitter 120 which is configured to provide illumination of target face 50. In one implementation, laser transmitter 120 may be a partially coherent pulsed solid-state laser transmitter that operates in the near infrared portion of the electromagnetic radiation spectrum beyond the normal photometric response range of the human eye (e.g., greater than 770 nm), but within the spectral response of typical solid-state optical detectors, e.g., silicon charge coupled devices (CODs). For instance, a low-average power laser operating in the visible band may also be undetectable if the ambient light is sufficiently high (e.g., daylight conditions). The temporal width of the laser pulse should be sufficiently short to freeze the motion of system 100 and target face 50. A pulse width shorter than 100 microseconds may be sufficient for most remote, covert facial imaging scenarios. A pulsed laser, for instance, may be used to "freeze" the image of the speckle pattern. This may enable imaging of moving targets.

In one implementation, laser transmitter 120 may be a selectable coherence laser. The temporal coherence length of the laser may be selectable in a range from a fraction of a millimeter to more than a centimeter, for instance, for facial recognition applications.

Of course, it will be appreciated that other light sources may also be used, such as, laser diodes, light emitting diodes, continuous wave (CW) solid-state lasers, filtered incandescent lamps, atomic vapor lamps, fluorescent tubes, etc. And it will be appreciated that various spectra of light could be used in accordance with the embodiments disclosed herein, such as visible, ultraviolet (UV), or infrared (IR).

Timing and control electronics 110 direct laser driver 115 and laser transmitter 120 to fire and manage the timing of the bias and readout cycles for the optical detector 135. Such systems are known in the art for controlled laser pulse timing. Separate mode control 105 may be used to switch the timing of the laser driver 115 and the frame rate and or format of the optical detector 135 based on the target size, range, reflectivity, surface texture characteristics, atmospheric transmission, and ambient lighting conditions. For example, a poorly illuminated target face may require greater pulse energy or a longer dwell time (CW source) to achieve the desired signal-to-noise ratio relative to a lighter target surface. If the laser is a continuously-pumped and Q-switched solid state laser, the mode control 105 may command the timing and control electronics 110 to lengthen the period between laser pulses resulting in a higher laser pulse energy and also to reduce the frame rate of the optical detector to maintain synchronization with the new laser pulse rate.

Transmit optics 125 may be provided and configured to shape, focus, and/or correct aberrations of the beam of electromagnetic radiation (light) 126 and direct it towards target face 10. Receiver optics 130 may include one or more lens, polarizers, filters, etc., as known in the art. The transmit optics 125 and receive optics 130 functions may be combined within a single optical system which may have shared elements such as lenses.

Speckle pattern 128 resulting from scattering the laser beam from the target face is collected by receiver optics 130 which image speckle pattern 128 onto optical detector 135. Receiver optics 130 may include a narrow bandpass optical filter to minimize reflected solar or thermal background noise. Speckle pattern 128 is sensed by optical detector 135 as an intensity image. In some implementations, optical detector 135 may be a charge coupled device (CCD), photodiode array, camera or other detector sensitive to electromagnetic radiation or light.

The speckle pattern imaged by the optical detector 135 may then be captured by frame grabber memory 140 or sent directly to processor 150 which extracts features, e.g., corresponding to differently sloped regions of target face 50.

A plurality of speckle interferometry image frames may be captured by optical detector 135 using different coherence length settings for laser transmitter 120. For instance, the lateral pixel spacing, as measured at the target, may be 5 mm, the center wavelength of laser transmitter 120 may be 904 nm, and the initial linewidth of laser transmitter 120 may be 200 GHz, corresponding to an initial coherence length of about 1 mm for shallow slope discrimination. The coherence length of laser transmitter 120 may be raised by about 1 mm in each iteration to discriminate steeper slopes. This process may be repeated multiple times as desired.

Processor 150 may be configured to read instructions for an algorithm to differentiate regions of the facial image between the less steeply sloped regions where the range difference within a voxel has a depth that is less than the coherence length of the laser (i.e., distinctive speckle pattern with no averaging) and the more steeply sloped regions where the range difference within a voxel has a depth that is greater than the coherence length of the laser (i.e., relatively uniform intensity where peaks and fades are averaged out). The output of processor 150 may include standard video interface format (such as, for example, IEEE RS 170), or a standard computer-interface format (serial or parallel).

The pointing function of 3-D imaging system 100 may be controlled by using a separate imager and video tracker system (not shown) which may be configured to point the sensor line-of-sight (LOS) toward target face 50. This pointing function might also be accomplished by the human operator using a small display, such as, for example, a liquid crystal display (LCD) device. With the imager, video tracker, and LOS pointing means, the field-of-view (FOV) of imaging system 100 may need only be slightly larger than the size of the target suspect's face or other feature of interest.

Rangefinder 155 may also be included, which drives zoom, iris and focus control servo mechanism 160 attached to receiver optics 130 to maintain target face 50 in sharp focus on optical detector 135.

To maintain focus, the accuracy of rangefinder 155 may be comparable to the depth-of-focus of receiver optics 130. In some implementations, range finder 155 may use a pulse from laser transmitter 120, a fast photodiode (not shown), and a conventional range counter to measure the time of flight of the laser pulse in the round trip to and from the target and use this to calculate the range to the target and the corresponding focus position of the receiver optics. Alternatively, a separate laser rangefinder, acoustic rangefinder, image-based system designed to peak spatial frequency in the image, or other auto-focusing means may be used separately, or in conjunction with the pulse-echo laser rangefinder described above.

The ranging requirement for focus control may be substantially more demanding than for zoom and iris control.

Instructions for a tomography algorithm may be applied to the multiple images to (1) extract the slope amplitude from the speckled images, (2) derive the direction of the slope which is orthogonal to the local edge boundary, and (3) create a 3-D image form the resulting vector slope information. The instructions may reside in processor 150, or in a separate computer-readable physical storage medium. Face image 170 may be output from processor 150. Output image 170 may be stored in memory (or database), displayed, printed, etc. Depending on the needs of law enforcement or government personnel, face image 170 may be run through a database of facial images or features, to identify suspects and/or terrorists.

Figure 2:
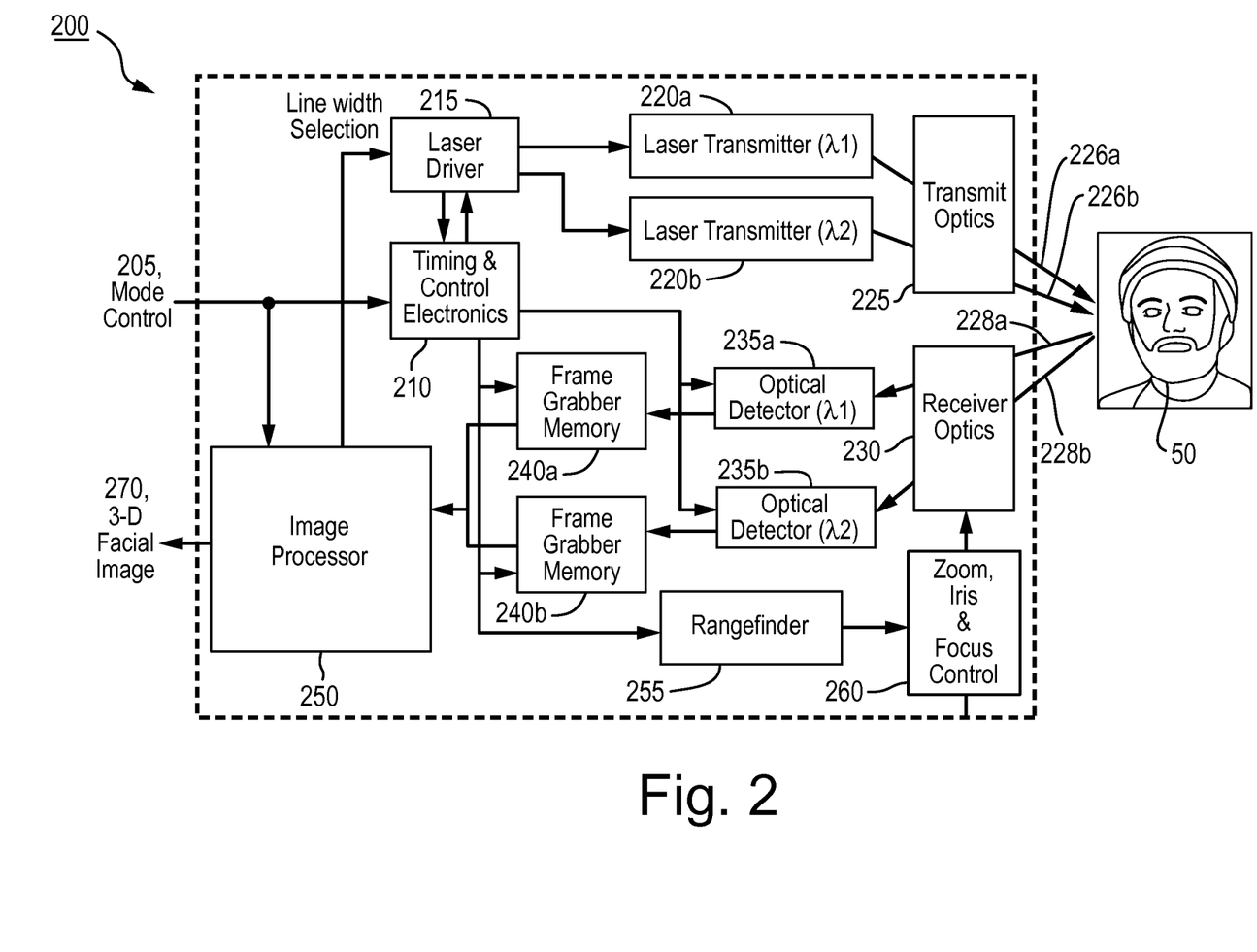
FIG. 2 illustrates a block diagram of an imaging system which uses two selectable-coherence lasers in accordance with an embodiment.

FIG. 2 illustrates a block diagram of imaging system 200 which uses two selectable-coherence lasers in accordance with an embodiment.

System 200 may be configured for remote, covert facial detecting similar to system 100 (FIG. 1). In this embodiment, two laser transmitters 220a, 220b may be used as the illumination source for target face 50, the return signals from each 228a, 228b are imaged using two optical detectors 235a, 235b, each connected to a frame grabber memory 240a, 240b. Laser transmitters 220a, 220b may be pulsed simultaneously, or in rapid succession. All other related elements may be similarly configured as shown in system 100 (FIG. 1).

For instance, laser driver 215 provides input to laser transmitters 220a, 220b which are configured to provide illumination source for target face 50. In one implementation, laser transmitters 220a, 220b may be partially-coherent pulsed solid-state laser transmitters which operate in the near infrared wavelength spectra. Although, it will be appreciated that various spectra could be used in accordance with the embodiments disclosed herein, such as visible, ultraviolet (UV), or infrared (IR). The separation in operating frequency between laser transmitters 220a, 220b is selected such that the speckle patterns associated with the relatively shallow regions are not well correlated. The temporal width of the laser pulse should be sufficient to "freeze" the motion of system 200 and target face 50. A pulse, for instance, having a width shorter than about 100 μs should be sufficient for most remote, covert facial recognition scenarios. Transmit optics 125 may be provided that are configured to shape, focus, and/or correct aberrations of the beam of electromagnetic radiation (light) 226a, 226b from respective laser transmitters 220a, 220b and direct them towards target face 50.

Speckle patterns 228a, 228b resulting from scattering the partially-coherent laser transmitter beam from the contoured surface, such as face 50, are collected by receiver optics 230 which images speckle patterns 228a, 228b onto respective optical detectors 235a, 235b. Receiver optics 230 may include a narrow bandpass optical filter to minimize reflected solar background noise. Speckle patterns 228a, 228b are imaged by optical detector 235a, 235b. In some implementations, optical detectors 235a, 235b may be a charge-coupled devices (CCD), photodiode arrays, cameras or other detectors. Optical detectors 235a, 235b may be spatially registered, but use different bandpass filters that are tuned to the different center lines of the two illumination lasers.

The output of frame grabbers 240a, 240b may be sent to one or more processors 250 which may be configured to perform image processing. Frame grabbers 240a, 240b are configured to capture individual images generated by optical detectors 235a, 235b, respectively. In some embodiments, the speckle pattern imaged by optical detectors 235a, 235b may be sent directly to processor 250 which is configured to extract features as a facial image.

Processor 250 may utilize one or more algorithms, to extract higher-level attributes from a facial image. Rangefinder 255 may also be included, which drives zoom, iris and focus control servo mechanism 260 attached to receiver optics 230. To maintain focus, the accuracy of rangefinder 255 may be comparable to the depth-of-focus of receiver optics 230. In some implementations, range finder 255 may use a pulse from either laser transmitter 220a or 220b, a fast photodiode (not shown), and a conventional range counter to measure the time of flight of the laser pulse in the round trip to and from the target and use this to calculate the range to the target and the corresponding focus position of the receiver optics 230. Alternatively, a separate laser rangefinder, acoustic rangefinder, image-based system designed to peak spatial frequency in the image, or other auto-focusing means may be used separately, or in conjunction with the pulse-echo laser rangefinder described above.

Timing and control electronics 210 direct laser driver 215 and laser transmitters 220a, 220b to fire and manage the timing of the bias and readout cycles for the optical detectors 235a, 235b. Such systems are known in the art for controlled laser pulse timing. Separate mode control 205 may be used to switch the timing of the laser driver 215 and the frame rate and or format of the optical detectors 235a, 235b based on the target size, range, reflectivity, surface texture characteristics, atmospheric transmission, and ambient lighting conditions. For example, a poorly illuminated target may require greater pulse energy or a longer dwell time (CW source) to achieve the desired signal-to-noise ratio relative to a lighter target surface. If the laser is a continuously-pumped and Q-switched solid state laser, the mode control 205 may command the timing and control electronics 210 to lengthen the period between laser pulses resulting in a higher laser pulse energy and also to reduce the frame rate of the optical detector to maintain synchronization with the new laser pulse rate.

The pointing function of system 200 may be controlled by using a separate imager and video tracker system (not shown) which may be configured to point the sensor line-of-sight (LOS) toward target face 50. This pointing function might also be accomplished by the human operator using a small display, such as, for example, a liquid crystal display (LCD) device. With the imager, video tracker, and LOS pointing means, the field-of-view (FOV) of imaging system 200 may need only be slightly larger than the size of the target suspect's face or other feature of interest.

A plurality of speckle interferometry image frames may be captured by optical detectors 235a, 235b with laser transmitters 220a, 220b set to the same linewidth, but operating at different center wavelengths. For instance, the lateral pixel spacing as measured at the target may be 5 mm, the center wavelength of laser transmitters 220a, 220b may be 904 nm and 910 nm. The linewidth of both transmitters may initially be 200 GHz, corresponding to an initial coherence length of about 1 mm for shallow slope discrimination. The coherence length of laser transmitter 220a, 220b may be raised by about 1 mm in each iteration to discriminate steeper slopes. This process may be repeated multiple times as desired.

The ranging requirement for focus control may be substantially more demanding than for zoom and iris control. Instructions for a tomography algorithm may be applied to the multiple images to (1) extract the slope amplitude from the speckled images, (2) derive the direction of the slope which is orthogonal to the local edge boundary, and (3) create a 3-D image form the resulting vector slope information. The instructions may reside in processor 250, or in a separate computer-readable physical storage medium. Face image 270 may be output from processor 250. Output image 270 may be stored in memory (or database), displayed, printed, etc. Depending on the needs of law enforcement or government personnel, face image 270 may be run through a database of facial images or features, to identify suspects and/or terrorists.

Image frames generated by optical detector 235a, 235b may have different speckle patterns in the regions of shallow slope but have approximately the same average intensity in regions of steep slope due to speckle averaging. When these frames are subtracted, for instance, by processor 250 the resulting image may show a highly mottled intensity pattern in less steeply sloped regions and nearly zero intensity where the speckle averaged image features cancel in the more steeply sloped regions.

A frame subtraction function may be performed by processor 250 wherein the image stored in frame grabber memory 240a is subtracted from the image of that stored in frame grabber memory 240b, resulting in a single frame of imagery. Additional processing may be performed to level-balance the two images before subtraction, such that the intensity in the more steeply sloped regions of the image in 240a is approximately equal to that in 240b. Further processing may be performed to take the absolute value of the resultant pixel values after subtraction, such that all pixel values are positive. The result is that the speckle-averaged regions corresponding to the more steeply sloped regions will essentially vanish in the subtracted frame, leaving a highly detectable speckle pattern within the less steeply sloped regions that is easier to process.

Imaging system 200 may in some instance be enabled to produce a higher video contrast, that may facilitate a more straightforward and accurate algorithmic edge extraction process, than imaging system 100 (FIG. 1).

Figure 3:
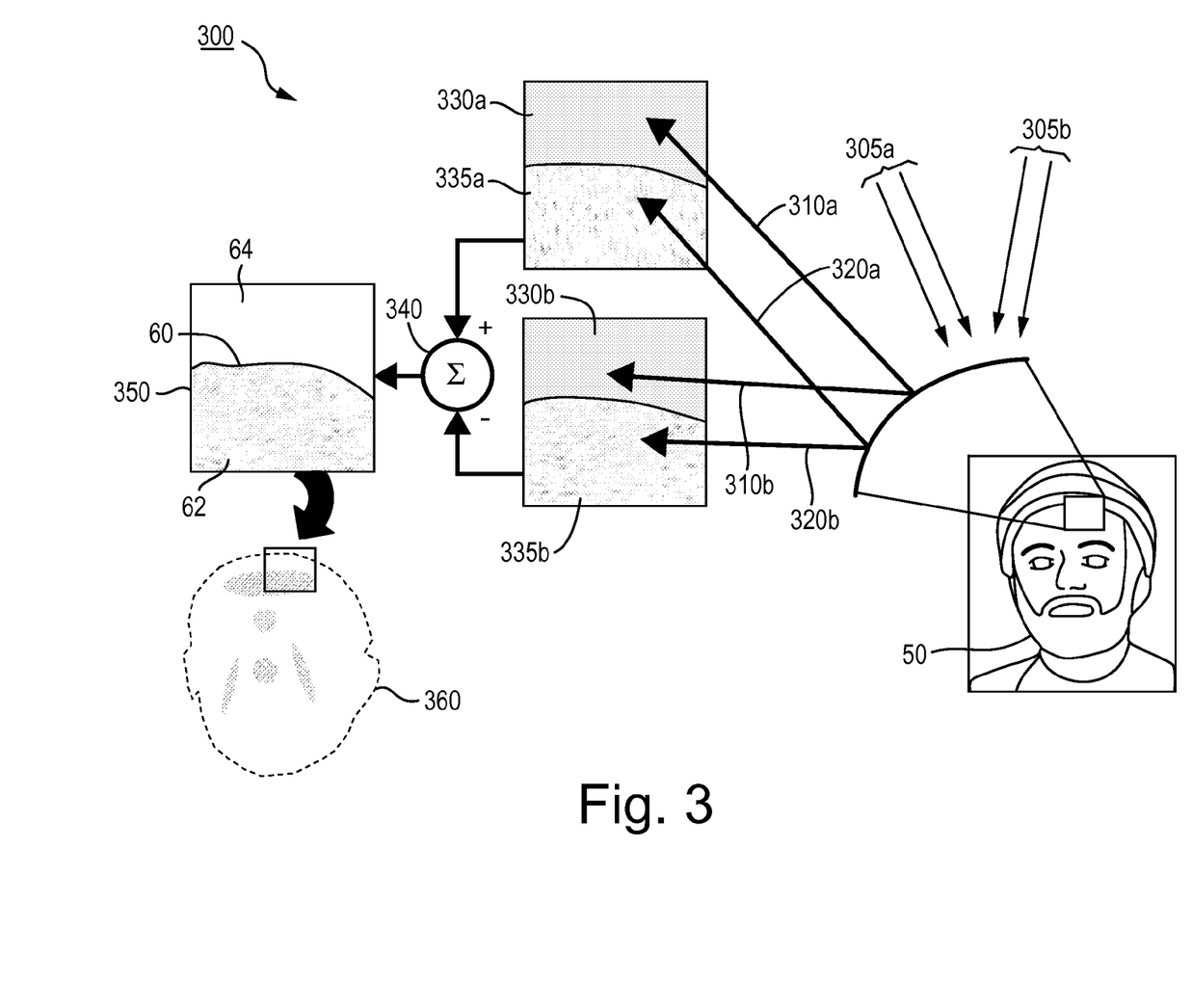
FIG. 3 depicts an exemplary method for imaging a contoured surface in accordance with an embodiment.

FIG. 3 depicts exemplary method 300 for imaging a contoured surface in accordance with an embodiment.

Method 300 uses imaging system 200 (FIG. 2) which is configured to generate a pictorial representation 360 of the speckle images from the two optical detectors and the resultant frame after subtraction and computing the absolute value of the subtracted values. It will be appreciated that a single speckle image could be generated using imaging system 100 (FIG. 1) in an analogous manner. Additional image enhancement techniques may be used in conjunction with imaging system 100, which may include high/low threshold enhancement and point expansion, as taught, for instance, in U.S. patent application Ser. No. 12/749,344, mentioned above.

Electromagnetic radiation 305a, 305b emitted, for instance, from laser transmitters 220a, 220b (FIG. 2) may be directed towards target face 50 from which it is reflected. Laser transmitter 220a, 220b may emit partially-coherent laser light of a specific coherence length. Note, for ease of clarity, radiation absorbed by target face 50 and/or reflected in directions other than toward optical detector 235a, 235b has been omitted.

In the embodiment shown, the contoured surface is of target face 50. Region 350 shows a portion of face 50 imaged on focal plane of optical detector 235a, 235b. A single contour line 60 of target face 50 is shown in FIG. 3 that represents boundary between regions of shallow slope 62 and steep slope 64. Of course, other contoured surfaces may be similarly detected.

When imaging system 200 is trained on a target face 50, shallow slope region 62 will reflect radiation 320a, 320b that will register as a sharp speckle pattern 335a, 335b, with a granularity of the order of the optical detector's diffraction-limited resolution (i.e., approximately equal to the laser wavelength divided by the receiver aperture diameter in units of radians). On the other hand, steep slope region 64 will reflect radiation 310a, 310b that will register as being substantially uniform region 330a, 330b (i.e., constant mid-level intensity, with no distinguishing features, due to speckle averaging). This averaging occurs because the physical depth within each voxel of the steep-slope region 64 is greater than the coherence length of the selectable-coherence laser transmitter beams at this particular setting of laser linewidth.

A frame subtraction function 340 may be performed by processor 250 to provide in a single frame of imagery, as discussed above. Further processing may be performed to take the absolute value of the resultant pixel values after subtraction, such that all pixel values are positive, also discussed above. An algorithm used to discriminate boundary edge between these regions resides in the image processor, and may be a straightforward form of pattern recognition. The algorithm may be a pattern recognition algorithm.

Facial image 360 may be output from image processor 250. Shallow sloped regions 62 appear as "darker" areas, and steeper sloped regions 64 appear as "lighter" areas. The contrast between the darker and lighter areas forms an image of the surface. In this case, image 360 detected corresponds to face 50.

For a normally incident face and a sensor-to-target distance of about 50 meters, the desired angular resolution of the sensor may be about 100 microradians (5 mm at target plane). Achieving this resolution, the pixel size is matched to the speckle feature size ($\lambda$/D). In one implementation, this may be achieved using diode lasers having center wavelengths near 900 nm and receiver optics of approximately 10 cm (3.9 inch) diameter. This is sufficiently small for clandestine surveillance.

A plurality of speckle interferometry image frames may be captured using different coherence length setting for laser transmitters 220a, 220b. The process may be repeated multiple times for different settings of the laser coherence length. For instance, the linewidth of both transmitters may initially be 200 GHz, corresponding to an initial coherence length of about 1 mm for shallow slope discrimination. The coherence length of both lasers may be raised by about 1 mm each iteration.

Figure 4:
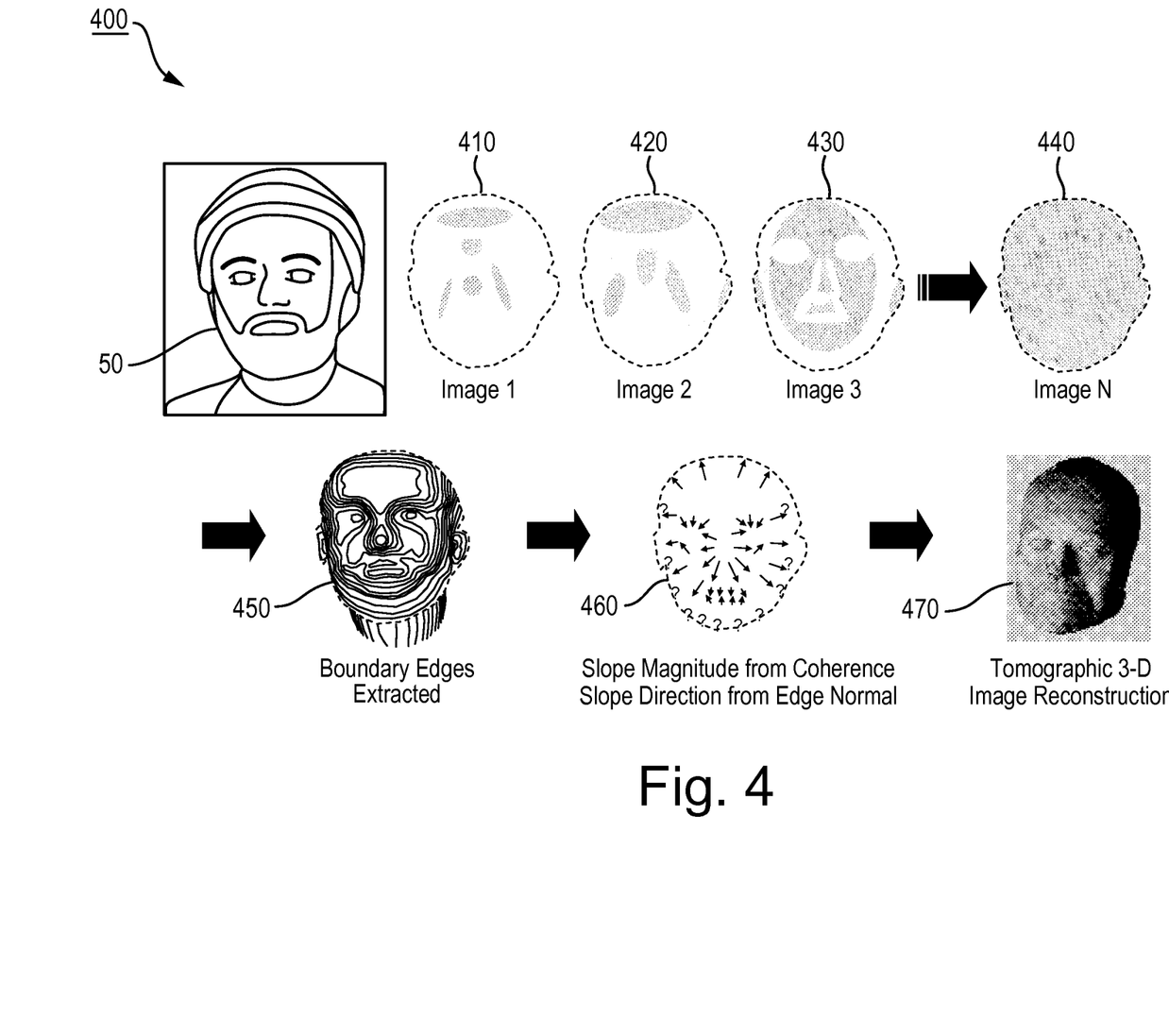
FIG. 4 depicts a tomography process used to reconstruct a 3-D image of a target face from multiple frames of partial-coherence speckle interferometry images in accordance with an embodiment.

FIG. 4 depicts tomography process 400 used to construct 3-D image 470 of target face 50 from multiple frames of partial-coherence speckle interferometry images in accordance with an embodiment.

Tomography is imaging by sections. Process 400 can be visualized as repeated processing of contour lines which will make up a 3-D facial image 470. As discussed above, each contour line represents the boundary between regions of different relative slopes (e.g., steep or shallow) which correspond to different coherence lengths of one or more partially-coherent lasers. Each frame adds an additional contour line to the facial image for each enclosed region of a given surface slope.

The slope of the contour lines may correlate to a voxel depth. Voxel depth may be a measure of the scalar slope of the surface (i.e., angle between surface normal and laser beam line-of-sight). Voxel depth may be a scalar measurement since the direction of the surface normal or steepest gradient vector is not measured directly.

A plurality of frames 410-440 may be captured according to one or more embodiments described herein. While only four images are shown, it will be appreciated that any number of images may be used, as determined by the overall depth of the contoured surface to be measured, the number of image frames captured, and the linewidth used to generate these individual images. The more image frames captured, the more contours of 3-D image 470 that may be generated.

After the plurality of frames 410-440 have been captured, topographic map 450 may be formed from frames 410-440. Topographic map 450 is a two-dimensional (2-D) image of target face 50 having lines of similar contours. To construct topographic map 450, boundary edges of the facial image may be extracted. This may be performed by one of many feature extraction algorithms know in the art of image processing, which may include image enhancement, edge detection, and edge modeling processes. The image enhancement process may include high/low threshold enhancement of the speckle image frames stored in frame grabber memory 140 of imaging system 100, (FIG. 1) as described in U.S. patent application Ser. No. 12/749,344, mentioned above. This process largely removes the speckle averaged values associated with the regions of relatively steeper slope.

Image enhancement may also include point-expansion enhancement of the thresholded image where all pixels in a specific radius surrounding each pixel with a maximum intensity value is also set to maximum intensity, also described in U.S. patent application Ser. No. 12/749,344. This process fills in the shallow-slope regions more completely without significantly changing the regions of relatively steeper slope within each image frame. Image enhancement may not be required for images 350 after subtraction, as the subtraction process itself enhances the contrast between regions 330a, 330b and 335a, 335b (FIG. 3).

The edge detection process seeks to locate the edges or step discontinuities within each frame where the intensity value changes most significantly between adjacent pixels. These edges are represented as contour lines in image 450. One edge detection algorithm which may be used is disclosed by Y. Zhou, V. Venkatswar, and R. Chellappa, "Edge Detection and Linear Feature Extraction Using a 2-D Random Field Model," *IEEE Transactions on Pattern Analysis and Machine Intelligence*, Vol. 11, Issue 1, pp. 84-85 (January 1989), herein incorporated by reference. That reference describes an algorithmic approach to edge detection which represents pixels in a local window by a 2-D causal autoregressive model, whose parameters are adaptively estimated using a recursive least-squares algorithm. The directional derivatives are functions of parameter estimates. An edge is detected if the second derivative in the direction of the estimated maximum gradient is negatively sloped and the first directional derivative and a local estimate of variance satisfy some conditions. Of course, different edge detection processes known in the art for automated fingerprint identification and other image processing applications may also be used without departing from the spirit or scope of the present invention.

The edge modeling process seeks to find a mathematical expression for a line shape that closely matches the detected edge. For example, a polynomial equation of a specific order may be assumed as the line shape function and a least-squares linear regression process may be used to calculate the polynomial coefficients that provide the best estimate of the line shape in a local region of image 450. Edge modeling of each edge or contour line allows straightforward calculation of slope gradient vectors, as described below.

The image enhancement, edge detection, and edge modeling processes may be performed by processor 150 of imaging system 100 or by processor 250 of imaging system 200.

From topographic map 450, slope gradient vectors may be determined, which can used to generate 3-D image 470. Image 460 shows slope gradient vectors corresponding to the contours of topographic map 450. The direction of steepest surface gradient is determined. This may be performed, for instance, by using an algorithm which recognizes that the steepest gradient is normal to the direction of the contour line. The algorithm may begin with the contour line corresponding to smallest coherence length (most shallow slope) which will generally enclose a relatively flat region of the target surface. The algorithm may then calculate the direction of a unit vector that is tangent to the contour line at a particular point along the contour line. The direction of this unit vector may be determined relative to the orientation of optical detectors 235a, 235b, wherein a row of pixel elements may represent one Cartesian direction and a column of pixels may represent the orthogonal Cartesian direction. The algorithm may then calculate the direction of a slope gradient vector that is normal to this unit vector and pointing outward from the enclosed region. The magnitude of this slope gradient vector may be assigned a value corresponding to the gradient of the contoured surface as determined by the coherence length of the laser used to generate the contour. The magnitude (A) of this vector may be given by:

$$A = k l_C / Z^{1/2}$$

where:
k=dimensionless constant found empirically through a sensor calibration process
$l_C$=laser coherence length
Z=area of pixel measured at target The algorithm may then compute a slope gradient vector for other points along the contour line corresponding to the smallest coherence length. The slope gradient vectors, so computed, may be centered on the pixels that lie approximately along the contour line.

The algorithm may then repeat this process for subsequent frames of progressively longer coherence-length laser lines. For local maxima in the contour surface that may be associated with a forehead or nose feature, the algorithm will function in a very straightforward fashion. For relatively flat regions that may encircle a local maximum, such as the high cheek region of the face below the eyes, steeper regions will exist both inside and outside the enclosed region. An assumption is made that the direction of the slope gradient vectors always point outward of the enclosed region. If there are local minima on the contoured surface corresponding to regions with a concave topology, this assumption will cause these regions to be represented as if they had a convex topology, and additional information would be required to resolve the ambiguity, such as a priori information about the expected surface topology or two or more views of the object.

Additional pathologies may appear in topographic map 450, which may make the determination of vector slope ambiguous. These may include, for example, near-vertical edges that straddle voxels, facial hair and heavily textured surface features. The algorithm may assign a special designation to the slope gradient vector within these regions identifying them as ambiguous or unmeasurable. Alternatively, the partial-coherence interference measurements may be used to sense some texture feature within these regions, for example the approximate depth of the facial hair that is detectable by the sensor. Additionally or alternatively, it may also be desirable to provide algorithmic smoothing of the contour lines to reduce artifacts due to system noise and pixilation. This may improve the accuracy of the vector slope estimation.

Given the nature of the surface rendering algorithm (described below), it may be advantageous to convert the slope gradient vectors, shown as arrows in 460, into 3-D unit vectors that are normal to the contoured surface with origin at each pixel center; these are typically referred to as "surface normals" or simply "normals." The surface normal associated with a given pixel will lie in the same plane as both the line-of-sight vector between sensor 200 and the pixel location on target face 50 and its corresponding slope gradient vector, and will be tipped at an angle relative to the line-of-sight vector equal to arctan(A).

Next, 3-D image 470 may be rendered, for instance, using computer-implemented algorithms, based on the slope gradient vectors shown in image 460 or the corresponding surface normals. This rendering may include, for example, the process taught by Tai-Pang Wu and Chi-Keung Tang (T. Wu and C. Tang, "Visible Surface Reconstruction from Normals with Discontinuity Consideration," *Proceedings of the IEEE Computer Society Conference on Computer Vision and Pattern Recognition*, pp. 1793-1800, (2006), herein incorporated by reference), which describes an algorithmic optimization method for deriving a segmented surface description from imperfect surface normals. This algorithm advantageously accommodates discontinuities in the contoured surface thereby preserving fine details within each output segment while the occlusion boundaries are localized as sharp surface discontinuities.

3-D facial image 470 may be rendered by processor 250 (FIG. 2) for display on a suitable display device, and/or printed. Processor 250 may generate computer-readable instructions for rendering an image, which include voxel information in three coordinate directions (e.g., x, y, z). Although, the display device may display in 2-D, processor 250 may be configured to output a projection of 3-D image 470 for display on the display device (or to the printer) having various vantage points. Similarly, 3-D image 470 can be printed. In one implementation, a user may be able to selectively adjust the vantage point of 3-D image 470.

Processor 250 may also be configured to output a pseudo-color image of the 3-D image where the x and y coordinates are represented as the 2-D image and the z coordinate is represented as a variation in color. Similarly, the z coordinate may be represented as a variation in grey-scale intensity.

Additional embodiments may be provided in certain instances. These may include, for instance, the use of different illumination sources, scanning receivers, hyperspectral imagers, and processing architectures. These may also include different algorithmic means for performing the edge extraction, slope gradient vector or surface normal determination, and 3-D surface reconstruction functions described herein.

Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. A system for imaging a contoured surface comprising:
a light source configured to project a beam of partially coherent electromagnetic radiation onto the contoured surface, wherein the projected beam generates first radiation scattered from a first portion of the contoured surface to form a speckle pattern, and second radiation scattered from a second portion of the contoured surface to form a pattern which is substantially uniform in intensity;
an optical detector configured to receive the first and second scattered radiation from the contoured surface, wherein a coherence length of the light source is greater than a depth of the first portion of the contoured surface and less than a depth of the second portion of the contoured surface, when imaged within a single pixel of the optical detector; and
a processor configured to (1) generate a plurality of images from the first and second scattered radiation, with each image being generated using different coherence length electromagnetic radiation from the light source, and (2) generate a 3-D image of the contoured surface from the plurality of images.

2. The system according to claim 1, wherein the light source is a pulsed laser.

3. The system according to claim 1, wherein the light source is a partially coherent laser.

4. The system according to claim 1, wherein the light source is configured to project partially coherent electromagnetic radiation that is generally undetectable by a human eye under ambient conditions.

5. The system according to claim 1, wherein a coherence length of the light source may be selectable in a range from a fraction of a millimeter to more than a centimeter.

6. The system according to claim 1, further comprising:
a second light source configured to project a second beam of partially coherent electromagnetic radiation beam onto the contoured surface, wherein the second projected beam generates third radiation scattered from the first portion of the contoured surface to form a speckle pattern, and fourth radiation scattered from the second portion of the contoured surface to form a pattern which is substantially uniform in intensity pattern; and
a second optical detector configured to receive the third and fourth scattered radiation from the contoured surface.

7. The system according to claim 6, wherein the processor is configured to combine an image of the first and second scattered radiation and the image of the third and fourth scattered radiation.

8. The system according to claim 7, wherein the processor uses frame subtraction so as to substantially eliminate imagery features from combined image of said second portion of the contoured surface.

9. The system according to claim 6, wherein the second beam has a different wavelength than the first electromagnetic radiation beam.

10. The system according to claim 1, wherein a coherence length of the light source is raised or lowered approximately 1 mm for each image.

11. A method for imaging a contoured surface, comprising:
generating a plurality of images by:
projecting a beam of partially coherent electromagnetic radiation onto the contoured surface, wherein the projected beam generates first radiation scattered from a first portion of the contoured surface to form a speckle pattern, and second radiation scattered from a second portion of the contoured surface to form a pattern which is substantially uniform in intensity; and
receiving, with an optical detector, the first and second scattered radiation from the contoured surface, wherein each image is generated using different coherence length electromagnetic radiation from the light source, wherein a coherence length of the light source is greater than a depth of the first portion of the contoured surface and less than a depth of the second portion of the contoured surface, when imaged within a single pixel of the optical detector, and
generating, with a processor, a 3-D image of the contoured surface from the plurality of images.

12. The method according to claim 11, further comprising generating the electromagnetic radiation with a pulsed laser.

13. The method according to claim 11, wherein the projected partially coherent electromagnetic radiation is a partially coherent laser beam.

14. The method according to claim 11, wherein the projected partially coherent electromagnetic radiation is generally undetectable by a human eye under ambient conditions.

15. The method according to claim 11, wherein a coherence length of the light source may be selectable in a range from a fraction of a millimeter to more than a centimeter.

16. The method according to claim 11, further comprising:
projecting a second beam of partially coherent electromagnetic radiation onto the contoured surface, wherein the projected beam generates third radiation scattered from the first portion of the contoured surface to form a speckle pattern, and second radiation scattered from the second portion of the contoured surface to form a pattern which is substantially uniform in intensity; and
receiving, with a second optical detector, the third and fourth scattered radiation from the contoured surface.

17. The method according to claim 16, further comprising: processing the third and fourth scattered radiation, with a processor, to generate an image.

18. The method according to claim 17, wherein the processing comprising combining an image of the first and second scattered radiation and the image of the third and fourth scattered radiation.

19. The method according to claim 18, wherein the processing comprises frame subtraction so as to substantially eliminate imagery features from combined image of said second portion of the contoured surface.

20. The system according to claim 16, wherein the second partially coherent electromagnetic radiation beam has a different wavelength than the first partially coherent electromagnetic radiation beam.

* * * * *